United States Patent Office

2,887,440
Patented May 19, 1959

2,887,440

ENTERIC COATING

George K. Greminger, Jr., and Francis E. Windover, Midland, Mich., assignors to The Dow Chemical Company, Midland, Mich., a corporation of Delaware No Drawing. Application August 12, 1957
Serial No. 677,764

2 Claims. (Cl. 167—82)

This invention relates to compositions useful as enteric coatings. More particularly, it relates to mixtures of ethylcellulose and hydroxypropyl methylcellulose and to enteric coatings comprising such mixtures.

It is frequently desirable in the internal administration of pills, capsules, and the like, which contain drugs, that the pill or capsule remain intact for a predetermined time after administration so as to disintegrate and release the drug at the desired point in the alimentary canal. Many materials have been proposed for enteric coatings but none have been found to be entirely satisfactory, particularly as to accuracy of control of dissolution rate and ease of fabrication and application.

It is an object of this invention to provide enteric coating compositions characterized by a widely variable but precisely controllable rate of dissolution in the alimentary canal of humans and other animals and by ready solubility in a variety of common organic solvents. The latter characteristic is important because it enormously facilitates fabrication of capsules, application of coatings to pills, and the like.

According to the invention, compositions having the desired properties are obtained by mixing, in suitable proportions, two cellulose ethers: (1) hydroxypropyl methylcellulose and (2) ethylcellulose. Each of these ethers should be of a suitable critical composition and the two should be mixed in a critical ratio, as is more fully described hereinafter.

Satisfactory enteric coatings are obtained from a mixture of (1) hydroxypropyl methylcellulose containing about 5 to 15% by weight of 2-hydroxypropoxyl groups and about 27 to 32% of methoxyl groups and (2) ethylcellulose containing about 42 to 49.5% of ethoxyl groups. The ratio in which these two components are mixed will depend largely on the rate of dissolution that is desired in the coating and will in general be in the range of about 3:1 to 1:3. Thus, there should be a minimum of about 25% of each component in the mixture. Compositions falling within the above ranges are characterized by solubility in both aqueous and suitable organic solvents and by the ability to form films, coatings and the like which slowly dissolve in aqueous solvents. The former property enables easy fabrication of capsules, tablet coatings and the like from solutions in organic solvents while the latter enables the formation of enteric coatings having the desired rate of dissolution in the alimentary canal. Both properties are essential in a satisfactory enteric coating material.

Both components of our enteric coating composition are well known to be non-toxic and non-irritating when taken internally.

The practice of the invention is illustrated by the following example.

A 10% by weight solution of hydroxypropyl methylcellulose was prepared by dispersing in benzene a cellulose ether having 50 cps. viscosity (2% solution in water) and containing about 6% by weight of 2-hydroxypropoxyl groups and about 28% of methoxyl groups. A 10% solution of ethylcellulose (medium, 50 cps., 46% ethoxyl) in methanol was similarly prepared and the two solutions were mixed. The resulting solution was clear and of a suitable viscosity for casting films, dip-coating tablets or forming capsules. Its viscosity was readily and widely adjustable by adjusting the amount of solvent used. Films or coatings made from this composition dissolved in water at the rate of 1 mil thickness in 3½ hours. The disintegration time was readily controllable by adjusting either the thickness of the film, capsule, coating, or the like or relative proportions of the two cellulose ethers. The effect of the latter variation is shown by the data in the following table wherein the disintegration times are shown for 1-mil films of cellulose ether compositions. The compositions consist of mixtures in various proportions of the hydroxypropyl methylcellulose (HPMC) and ethylcellulose (EtC) used above.

TABLE I

Disintegration time for 1-mil films of cellulose ethers in water

| Cellulose ether | Time |
|---|---|
| 75% HPME / 25% EtC | 10 minutes. |
| 60% HPME / 50% EtC | 2½ hours. |
| 50% HPME / 50% EtC | 3½ hours. |
| 25% HPME / 75% EtC | 5¾ hours. |

The times shown above for the disintegration of 1-mil films in water at room temperature closely parallel those of films of other thicknesses as well as those of capsules and tablet coatings in the alimentary canal of man and other animals. A special feature is that the rate of dissolution is substantially independent of the pH of the aqueous medium. Because of this feature, the disintegration time of any particular enteric coating in the alimentary canal is substantially constant and accurately predictable, regardless of the variations in pH in different parts of the canal, in different individuals and in different species of animals.

By use of cellulose ethers of other degrees of substitution within the limits set forth above, coating compositions having a wide range of disintegration times may be prepared.

If clear, transparent coatings are desired, it is preferred to use ethylcellulose of relatively low ethoxyl content; that is, about 42 to 45% ethoxyl. The high-ethoxyl material yields translucent coatings. If opaque coatings are desired, inert, non-toxic pigments may be incorporated into the coating composition, suitable ones being powdered charcoal, chalk and the like. Similarly, non-toxic dyes, plasticizers or filters may be incorporated into the compositions if desired.

We claim:

1. An enteric coating composition comprising a mixture of (1) hydroxypropyl methylcellulose containing 5 to 15% by weight of 2-hydroxypropoxyl groups and 27 to 32% by weight of methoxyl groups and (2) ethylcellulose containing 42 to 49.5% by weight of ethoxyl groups, the ratio of components (1) and (2) in said mixture being between about 3:1 and 1:3 parts by weight.

2. The process for making an enteric medicament comprising enclosing a medicament within an enteric covering comprising a mixture of (1) hydroxypropyl methylcellulose containing 5 to 15% by weight of 2-hydroxypropoxyl groups and 27 to 32% by weight of methoxyl groups and (2) ethylcellulose containing 42 to 49.5% of ethoxyl groups, the ratio of components (1) and (2) in said mixture being between about 3:1 and 1:3 parts by weight.

References Cited in the file of this patent

UNITED STATES PATENTS

| | | |
|---|---|---|
| 2,753,273 | Cohen | July 3, 1956 |
| 2,810,659 | Greminger | Oct. 22, 1957 |

FOREIGN PATENTS

| | | |
|---|---|---|
| 734,624 | Great Britain | Aug. 3, 1955 |
| 109,438 | Australia | Jan. 11, 1940 |

OTHER REFERENCES

Thompson et al.: "History, Literature and Theory of Enteric Coatings," J.A.P.A., Sci. Ed., vol. 34, No. 5, May 1945, p. 135.